(12) United States Patent
Richard

(10) Patent No.: US 6,200,448 B1
(45) Date of Patent: Mar. 13, 2001

(54) METHOD OF MANUFACTURING NICKEL HYPOPHOSPHITE BY THE ELECTRO-MEMBRANE TECHNIQUE

(75) Inventor: André Emile Joseph Richard, Argenteuil (FR)

(73) Assignee: Etablissements A. Richard, Argenteuil (FR)

( * ) Notice: Subject to any disclaimer, the term of this patent is extended or adjusted under 35 U.S.C. 154(b) by 0 days.

(21) Appl. No.: 09/466,997

(22) Filed: Dec. 17, 1999

(30) Foreign Application Priority Data

Dec. 18, 1998 (FR) .................................................. 98 16273

(51) Int. Cl.[7] .................................................. B01D 61/44
(52) U.S. Cl. ........................................... 204/529; 205/488
(58) Field of Search .............................. 205/488; 204/529

(56) References Cited

U.S. PATENT DOCUMENTS 5,522,972 * 6/1996 Nobel et al. .......................... 205/488
5,716,512   2/1998 Vaughan ................................ 205/488

FOREIGN PATENT DOCUMENTS 0 693 577 A1   1/1996 (EP) .
   795636      5/1958 (GB) .

OTHER PUBLICATIONS

Alheritiere et al., Metathesis of Magnesium and Sodium Salt Systems by Electrodialysis, Jul. 1, 1998, pp. 189–198, Desalination, vol. 115, No. 2.

* cited by examiner

*Primary Examiner*—Arun S. Phasge
(74) *Attorney, Agent, or Firm*—Wolf, Greenfield & Sacks, P.C.

(57) ABSTRACT

The method of manufacturing nickel hypophosphite from a solution of hexahydrated nickel sulfate and a solution of monohydrated sodium hypophosphite by an electro-membrane technique, consists:

a) in introducing respectively the hexahydrated nickel sulfate solution and the monohydrated sodium hypophosphite solution into each of two dilution circuits of four-compartment electrodialysis cells formed by alternating stacks of cationic and anionic homopolar membranes in an electrodialysis apparatus having an anode and a cathode that are insoluble;

b) in applying an electrical current from the anode to the cathode without regulating the pH of the solutions contained in the dilution and concentration circuits but regulating the electricity supply, either in voltage or in current; and c) in recovering a hexahydrated nickel hypophosphite solution from one of the concentration circuits.

10 Claims, 2 Drawing Sheets

METHOD OF MANUFACTURING NICKEL HYPOPHOSPHITE BY THE ELECTRO-MEMBRANE TECHNIQUE

The present invention relates to manufacturing nickel hypophosphite under conditions enabling it to be used directly as the sole active component in the chemical (or "electroless") nickel-plating process.

BACKGROUND OF THE INVENTION

Traditionally, the chemical nickel-plating process makes use of nickel salts and a hypophosphite, e.g. hexahydrated nickel sulfate and monohydrated sodium hypophosphite. It has already been recommended to replace those two components with a single component, namely nickel hypophosphite. It turns that using this single component leads to an increase in the lifetime of solutions for chemical nickel plating and consequently to decreasing the amount of pollution by nickel; in addition, this new formulation gives rise to the resulting nickel deposits being of better quality, in particular by reducing internal tensions.

Nickel hypophosphite can be produced by causing hypophosphorous acid to react with nickel hydroxide or with nickel carbonate or with some other suitable nickel salt. That purely chemical manufacturing technique suffers from being very expensive.

Proposals have already been made in document EP 693 577 to produce nickel hypophosphite by a method that implements the following steps, namely: putting a nickel anode in contact with a solution of hypophosphite anions; applying electrical current from said anode to a cathode that is itself in electrical contact with said solution so that the nickel of the anode is dissolved into the hypophosphite solution, thereby forming a solution of nickel hypophosphite; and recovering and concentrating said solution of nickel hypophosphite.

The same method can be implemented in an electrodialysis cell having three compartments separated by ion exchange membranes, one for cations and the other for anions. In the receptacle acting as an electrolyzer, the central compartment contains a hyposulfite solution of an alkali metal; it is separated from the compartment containing the nickel anode by an anionic membrane, i.e. a membrane that enables anions to diffuse, but that prevents cations from diffusing; in addition, it is separated from the cathode compartment by a cationic membrane, i.e. a membrane that enables cations to diffuse while preventing anions from diffusing. The solutions contained respectively in the anode compartment (referred to as "anolyte") and in the cathode compartment (referred to as "catholyte") are selected to be conductive so that electricity can pass through these solutions when a voltage is applied. Specifically, the analytic solution contains hypophosphorous acid, and the catholytic solution contains caustic soda, both at predetermined concentration and pH. Nickel hypophosphite forms in the compartment containing the anolytic solution.

Document U.S. Pat. No. 5,716,512 proposes a method and an installation for manufacturing nickel hypophosphite from a solution of nickel sulfate and a solution of sodium hypophosphite by using the electro-membrane technique. In example 8, as illustrated in FIG. 9 of that document, both electrodes are insoluble, a second cell delivering the anolyte to the first under conditions comparable to those that are obtained in example 1 from a nickel anode that is soluble. In that method, a pH regulator is provided to activate or deactivate the electrodialysis cell to adjust and control the pH, at least of the first electrolyte. Doubtless the purpose of monitoring the pH of the solutions contained in the various compartments of the first cell is to avoid unwanted and harmful precipitation of nickel hydroxide at the interfaces of the various membranes.

OBJECT AND SUMMARY OF THE INVENTION

The object of the present Applicant is to provide a method of manufacturing nickel hypophosphite that implements an electro-membrane technique that is different from that described in document EP 693 577, the electrodialysis not requiring the use of a soluble nickel anode, and different from that described in document U.S. Pat. No. 5,716,512, the electrodialysis not requiring the pH of the solutions to be regulated. This object is achieved by the method of the invention which consists:

a) in introducing respectively the hexahydrated nickel sulfate solution and the monohydrated sodium hypophosphite solution into each of two dilution circuits of four-compartment electrodialysis cells formed by alternating stacks of cationic and anionic homopolar membranes in an electrodialysis apparatus having an anode and a cathode that are insoluble;

b) in applying an electrical current from the anode to the cathode without regulating the pH of the solutions contained in the dilution and concentration circuits but regulating the electricity supply, either in voltage or in current; and c) in recovering a hexahydrated nickel hypophosphite solution from one of the concentration circuits.

Thus, in the method of the invention, there are no electrochemical reactions at the electrodes, and in particular no dissolution of the anode. By using ion transport through the membranes, the initial salts, i.e. sodium hypophosphite and nickel sulfate, are both subjected to decomposition leading to ion pairs recombining in two ways: nickel hypophosphite and sodium sulfate. Preferably, the anode is made of platinum-plated titanium and the cathode is made of stainless steel.

With reference to document U.S. Pat. No. 5,716,512, the installation described in example 8 and shown in FIG. 9 dozes not make use of four-compartment electrodialysis cells made by stacking cationic and anionic homopolar membranes in alternation; even though FIG. 9 does show four compartments C1 to C4, those four compartments include the two electrode compartments, and they are separated by three membranes only, two cationic membranes and one anionic membrane.

The electrical power supply is said to be regulated in that the electrical parameters of the electrodialysis are controlled so that at no stage during the method of the invention is nickel hydroxide observed to precipitate at the membrane interfaces.

More particularly, the electrical voltage applied between the cells must necessarily be less than 18 volts since otherwise nickel hydroxide will be caused to precipitate and it is possible that the membranes will be damaged.

Since the manufacturing method is a discontinuous method, in which it is desired to increase the concentration of the nickel hypophosphite solution, the electrical power supply is switched off once the indicated voltage is equal to 18 volts.

Starting from a nickel hypophosphite solution at 1.1 grams per liter (g/l), and after operating for a period of the order of 405 min to 415 min, the resulting nickel hypophosphite solution had a concentration of the order of 202 g/l to 212 g/l.

The current applied to the electrodialysis while implementing the method is at a density of up to 150 amps per square meter ($A/m^2$) for a voltage density of up to 5 volts per cell.

Preferably, the concentration of hexahydrated nickel sulfate in the first dilution circuit lies in the range 0 to 2 M, the concentration of the monohydrated sodium hypophosphite solution in the second dilution circuit lying in the range 0 to 4 M, the concentration of the sodium sulfate solution obtained in the first concentration lying in the range 0 to 1 M, and the concentration of the hexahydrated nickel hypophosphite solution obtained in the second circuit lying in the range 0 to 1 M. Both electrodes are disposed in electrode compartments which are separated from the electrodialysis compartments by respective cationic membranes, the anode compartment being in register with an anionic membrane and the cathode compartment with a cationic membrane.

Both electrode compartments are filled with a solution of sodium sulfate, which constitutes the electrically conductive electrolyte for electrodialysis in the various cells. During electrodialysis, both electrode compartments constitute ion-transfer receptacles, for transferring sodium ions in the cathode compartment and sulfate ions in the anode compartment. Identical ions are thus transferred into these two electrode compartments during electrodialysis, which ions recombine giving rise to variations in sodium sulfate concentration in the two compartments, i.e. a reduction of the sodium sulfate concentration in the cathode compartment and an increase of the sodium sulfate concentration in the anode compartment.

When the method of the invention for manufacturing nickel hypophosphite is implemented as a continuous manufacturing method, a certain quantity of concentrated hexahydrated nickel hypophosphite solution is periodically taken from the corresponding concentration circuit C2 and a certain quantity of hexahydrated nickel sulfate and sodium hypophosphite solution is periodically introduced into the two dilution circuits D1 and D2 so as to maintain a predetermined level of electrical conductivity in the concentration circuit C2.

When it is desired to manufacture a concentrated nickel hypophosphite solution at 167 grams per liter (g/l), the conductivity of the concentrated nickel hypophosphite solution at 167 g/l is 35 millisiemens (mS).

BRIEF DESCRIPTION OF THE DRAWINGS

The present invention will be better understood on reading the following description of a preferred implementation of the method of manufacturing nickel hypophosphite by an electro-membrane technique, as illustrated in the accompanying drawings, in which.

MORE DETAILED DESCRIPTION

The method of the invention for manufacturing a hexahydrated nickel hypophosphite solution under conditions enabling it to be used directly as the sole active component in a chemical nickel-plating process is implemented using electrodialysis apparatus of conventional structure, having a stack of membranes and separating frames, electrode-carrying supply blocks, two electrodes, clamping plates, and circuits for causing the solutions to circulate.

Figure 1:
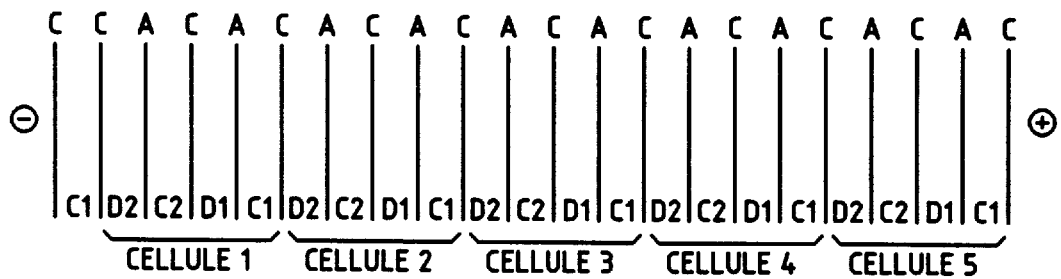
FIG. 1 is a diagram of a stack of membranes in electrodialysis apparatus having five four-compartment cells.

In the present case, the anode and the cathode are selected to be insoluble. Each electrodialysis cell has four compartments formed by an alternating stack of two cationic membranes (C) and two anionic membranes (A) as shown in FIG. 1. In the current flow direction (arrow I), going from the anode towards the cathode, each cell thus comprises a stack constituted by a first anionic membrane A, a first cationic membrane C, a second anionic membrane A, and a second membrane C.

The anode and cathode compartments at opposite ends of the stack of all of the cells are each separated from the stack by a corresponding cationic membrane C.

The space between A and C membranes in a single cell defines a circuit in which a solution is circulated. A compartment, i.e. a gap between two membranes, is referred to herein as being a "dilution" circuit when the electrodialysis gives rise to electrolyte being extracted from that compartment, whereas it is referred to herein as being "concentration" circuit when electrodialysis gives rise to electrolyte accumulating therein. In each four-compartment cell, there are two dilution circuits D1 and D2, and two concentration circuits C1 and C2. The dilution circuits are those which have an anionic membrane A at the upstream end of the compartment relative to the flow direction of the electric current I; cations migrate in the current flow direction so they cannot penetrate into such a compartment, but they can escape therefrom; the same applies to anions which migrate in the opposite direction. Concentration circuits C1 and C2 are circuits in which the upstream membrane of the compartment in the flow direction of the electric current I is a cationic membrane C. Cations migrate in the current direction and can therefore penetrate into this compartment but cannot escape therefrom. The same applies to anions that migrate in the opposite direction.

The electrode compartments E1 and E2 and the first concentration circuit C1 are initially filled with sodium sulfate at a concentration of about 20 g/l as the electrolyte, a solution of hexahydrated nickel sulfate is introduced into the first dilution circuit D1, a monohydrated sodium hypophosphite solution is introduced into the second dilution circuit D2, and a dilute solution of nickel hypophosphite is introduced into the second concentration circuit C2 of each electrodialysis cell, and then after a certain length of time, the concentrated hexahydrated nickel hypophosphite is recovered from the second concentration circuit C2. No provision is made to regulate the pH of the solutions contained in the dilution and/or concentration circuits.

Figure 2:
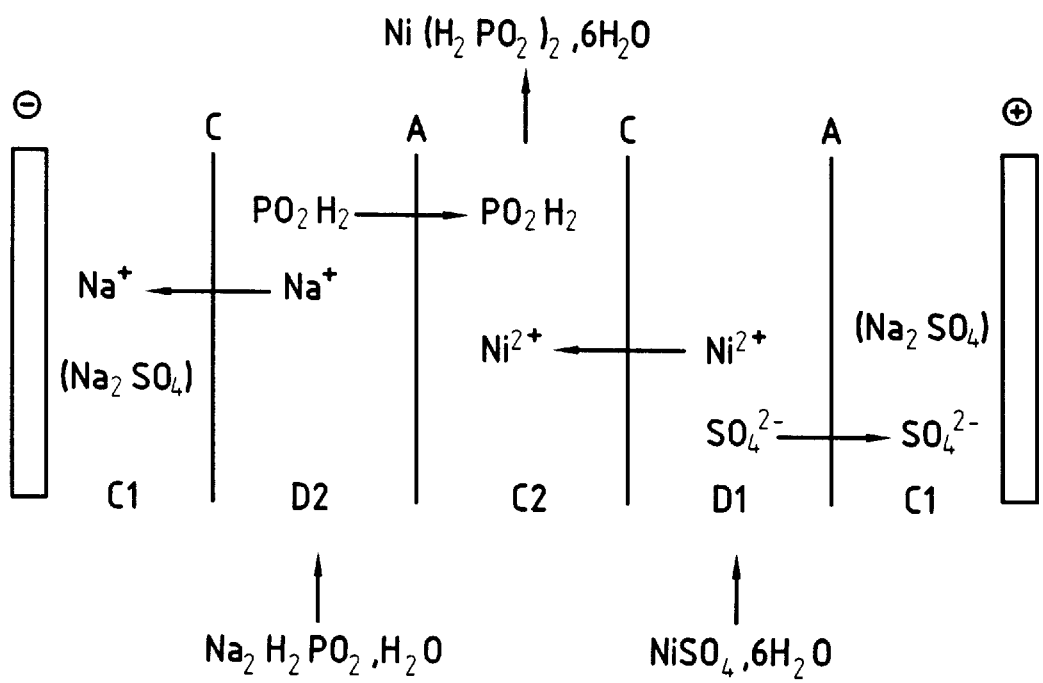
FIG. 2 is a diagram of one compartment showing the ion transfers involved.

As shown in FIG. 2, the nickel sulfate solution which is introduced into the first dilution circuit D1 is dissociated into $Ni^{2+}$ cations and into $SO_4^{2-}$ anions. Given the flow direction of the current I, the $Ni^{2+}$ cation migrates through the cationic membrane C and penetrates into the second concentration circuit C2 disposed downstream relative to the current flow direction, while the $SO_4^{2-}$ anion migrates through the anionic membrane A and penetrates into the first concentration circuit C1 disposed upstream.

The sodium hypophosphite solution which is introduced into the second dilution circuit D2 is dissociated into $Na^+$ cations and $PO_2H_2^-$ anions. The $Na^+$ cation migrates through the cationic membrane and penetrates into the concentration circuit located downstream relative to the current flow direction and which is the first concentration circuit C1 of the adjacent cell. The $PO_2H_2^-$ hypophosphite anion migrates through the anionic membrane and penetrates into the second concentration circuit C2 which is disposed upstream.

In the first concentration circuit C1, $Na^+$ cations and $SO_4^{2-}$ anions recombine, while in the second concentration circuit C2, $Ni^{2+}$ cations recombine with $PO_2H_2^-$ anions. It is thus in the second concentration circuit C2 that the nickel hypophosphite forms, and specifically in this case hexahydrated nickel hypophosphite.

By way of non-exhaustive example, the following results have been obtained on a small five-cell electrodialysis apparatus, using the stacking scheme illustrated in FIG. 1 and implementing twelve cationic membranes together with ten anionic membranes, with each membrane having a respective active area of 2 $dm^2$. The anode was made of platinum-plated titanium and the cathode was made of Sus.316 type stainless steel. The circulation rates of the solutions in each of the circuits, including in the electrode compartments could be varied over the range 0 to 500 liters per hour (l/h). The current density can be varied over the range 0 to 150 $A/m^2$, and the voltage density over the range 0 to 5 volts per cell. The method was implemented using an electrical power supply that was regulated either in voltage or else in current.

The maximum concentrations of the nickel sulfate solution and of the sodium hypophosphite solution supplied to the first and second dilution circuits D1 and D2 were respectively 2 moles per liter (M) and 4 M. The maximum concentration of the hexahydrated nickel hypophosphite solution obtained from the second concentration C2 was 1 M, as was the maximum concentration of the sodium sulfate obtained from the first concentration circuit C1.

The electrolyte used, i.e. sodium sulfate, was at a concentration of 20 g/l.

Under the above conditions, the yield with which hexahydrated nickel hypophosphite was manufactured was not less than 86%. Its pH lay in the range 3 to 6.

The concentration of hexahydrated nickel hypophosphite in water as manufactured by this electrodialysis method is predefined by calculating the concentrations for the mother solutions of hexahydrated nickel sulfate (1 g/l to 500 g/l) and of monohydrated sodium hypophosphite (1 g/l to 400 g/l) in water.

The solutions of hexahydrated nickel hypophosphite in water obtained by the method of the invention, at any concentration, were suitable for use directly in formulations of chemical nickel-plating baths, replacing all or some of the hexahydrated nickel sulfate and the monohydrated sodium hypophosphite.

In the first implementation described below, the method was of the discontinuous type, insofar as the nickel hypophosphite solution was taken once only at the end of a determined operating time that was long enough to obtain the desired concentration.

Four liters of sodium sulfate were prepared using demineralized water, heated to about 40° C. until conductivity was obtained lying in the range 20 mS to 22 mS, and preferably of 20.3 mS, corresponding to about 20 g/l of sodium sulfate. Two liters of that solution were introduced into the vessel reserved for the electrolyte, i.e. the first concentration circuit C1, and two liters were introduced into the sodium sulfate concentration vessel, i.e. the two electrode compartments.

A hexahydrated nickel sulfate solution was prepared from 2.5 liters of demineralized water and 418 grams, plus-or-minus one gram, of nickel sulfate. That solution was introduced into the dilution vessel corresponding to the first dilution circuit D1.

A monohydrated sodium hypophosphite solution was prepared from 2.5 liters of demineralized water and 517 grams, plus-or-minus one gram, of sodium hypophosphite. That solution was introduced into the dilution vessel corresponding to the second dilution circuit D2.

A dilute solution of hexahydrated nickel hypophosphite was prepared from 1.5 liters of demineralized water and 1.67 g of nickel hypophosphite. That solution was introduced into the concentration vessel corresponding to the second concentration circuit C2.

The flow meters for the solutions corresponding to the two dilution circuits D1 and D2 and to the second concentration circuit C2 were set at 100 l/h and the flow meter for the electrotype solution was set at 150 l/h. Once the flows had stabilized, the electrical voltage was set to the maximum and the electrical current was set to the minimum of the stabilized power supply. Electricity was applied and the current was set at 3 amps. The conductivity of the nickel sulfate solution was measured on a regular basis so as to keep it in the range 20 mS to 22 mS. Ion transfer corresponding to concentrating the nickel hypophosphite solution took place in 410 minutes, plus-or-minus 5 minutes. During that period, the electrical voltage, which began at about 14 to 15 volts, stabilized at around 8 to 8.5 volts prior to rising to 18 volts during the last hour. The stabilized power supply was switched off when the indicated voltage was equal to 18 volts. The resulting nickel hypophosphite solution was at a concentration lying in the range 202 g/l to 212 g/l, which is equivalent to 41 g/l plus or more 1 g/l of nickel. The resulting yield was about 95%.

The concentrated nickel hypophosphite solution obtained at the end of the operation was at a temperature lying in the range 31° C. to 33° C. At this concentration, nickel hypophosphite does not remain in solution at ambient temperature. To conserve the concentrated solution, it is necessary to maintain it at a temperature lying in the range 30° C. to 40° C. It is also possible to heat it only when it is used. Another possible technique is to dilute the solution so that the nickel hypophosphite is soluble at ambient temperature. For example this is the case when hexahydrated nickel hypophosphite is at a concentration of 167 g/l.

In the second implementation, the method of manufacturing hexahydrated nickel hypophosphite is a known method, the concentrated nickel hypophosphite solution being taken periodically whenever the conductivity of the nickel hypophosphite solution has a value close to a predetermined value corresponding to the desired concentration, and solutions of nickel sulfate and of sodium hypophosphite are likewise added periodically.

Figure 3:
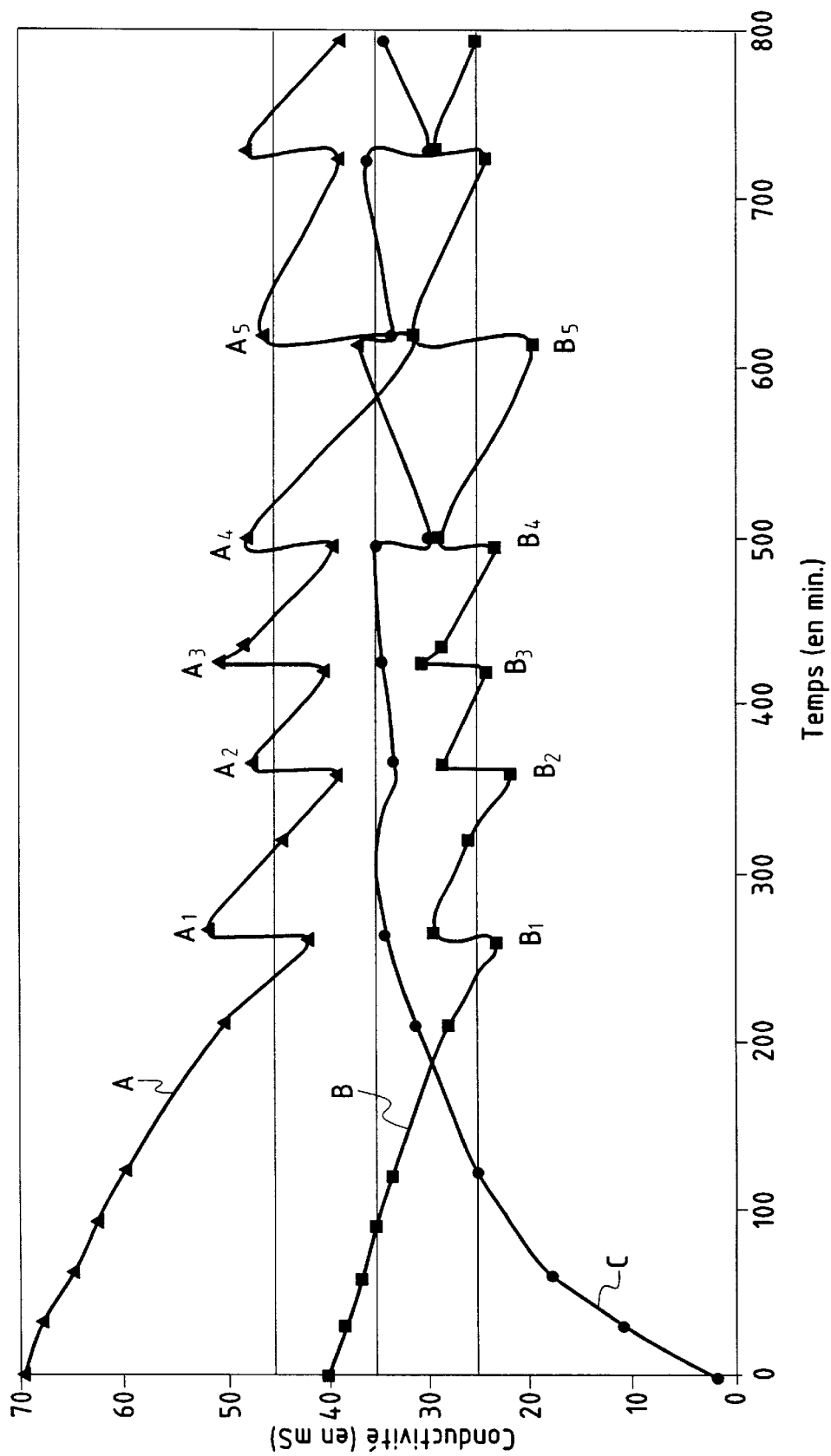
FIG. 3 is a graph showing conductivity as a function of time for continuous manufacture of nickel hypophosphite at a concentration of 167 g/l.

FIG. 3 shows three curves illustrating the conductivity as a function of time respectively of the monohydrated sodium hypophosphite solution (A), the hexahydrated nickel sulfate solution (B), and the hexahydrated nickel hypophosphite solution (C).

It has been observed that the conductivities of the various solutions vary as a function of their ion concentrations. Initially, the 300 g/l solution of hexahydrated sodium hypophosphite had conductivity of about 70 mS, and the 400 g/l solution of hexahydrated nickel sulfate had conductivity of about 40 mS. The diluted nickel hypophosphite solution at 1.1 g/l had conductivity of about 2 mS.

It is desired to manufacture a concentrated solution of hexahydrated nickel hypophosphite at 167 g/l with pH in the range 3 to 6. This concentration of salt corresponds to the solubility limit of nickel hypophosphite in water, thus enabling the product to be stored without the salt precipitating over time and without any risk of untimely reduction of the nickel ions by the reducing hypophosphite ion within the solution. The conductivity of the nickel hypophosphite solution at a concentration of 167 g/l is 35 mS. Thus, when the conductivity measured for the concentration circuit C2 reaches this value, additional concentrated solution of nickel sulfate and of sodium hypophosphite is added to the two dilution circuits D1 and D2, each addition comprising 250 ml in the specific example of the electrodialysis apparatus. The effect of making these additions was to increase immediately the conductivities of said solutions, which can be seen in the curves (A) and (B) by the peaks (A1) and (B1). When the conductivity of the solution of the second concentration circuit C2 reaches the value of 35 mS, a certain quantity of solution is extracted therefrom, e.g. one liter, and 500 ml of demineralized water is injected into said circuit. In the specific implementation described, this took place at 330 minutes after the start of the operation.

The following step consists in a second addition of nickel sulfate and sodium hypophosphite solution, giving rise to new peaks (A2, B2). All of these operations of adding or removing solution follow one another during the method of manufacturing nickel hypophosphite on a continuous basis. In FIG. 3, there can be seen six successive additions that took place over a period of 800 min. The additions need not take place at regular intervals. In particular, two hours elapsed between the peaks (A4) and (A5) and the addition corresponding to (A5) was double the preceding addition, i.e. 500 ml of nickel sulfate and of sodium hypophosphite instead of the above-mentioned 250 ml.

Concerning the electrical parameters, current was kept constant at 150 A/m$^2$, while the voltage was varied. The voltage began at 15.2 volts and dropped progressively over about 2 hours to stabilize at around 7.2 volts to 7.4 volts. Simultaneously, the temperature of the bath stabilized at around 37° C. to 38° C. In the event of stopping, in particular overnight, the temperature of the bath will decrease so voltage on restarting will be higher, e.g. 8.8 volts for a temperature of 25.8° C. Thereafter voltage and temperature stabilize again as described above.

Concentrated hexahydrated nickel hypophosphite solution is removed whenever the conductivity measured in the second concentration circuit C2 reaches the predetermined threshold, specifically in the present example 35 mS at a concentration of 167 g/l.

Nickel sulfate and sodium hypophosphite solutions are added when the conductivities of the first and second dilution circuits D1 and D2 drop below predetermined thresholds, e.g. 25 mS for the first dilution circuit D1 (nickel sulfate) and 45 mS for the second dilution circuit D2 (sodium hypophosphite). In practice, as can be seen in FIG. 3, what matters during such additions is that the conductivity values of said solutions should go back above the predetermined thresholds.

What is claimed is:

1. A method of manufacturing nickel hypophosphite from a solution of hexahydrated nickel sulfate and a solution of monohydrated sodium hypophosphite by an electro-membrane technique, the method consisting:

a) in introducing respectively the hexahydrated nickel sulfate solution and the monohydrated sodium hypophosphite solution into each of two dilution circuits of four-compartment electrodialysis cells formed by alternating stacks of cationic and anionic homopolar membranes in an electrodialysis apparatus having an anode and a cathode that are insoluble;

b) in applying an electrical current from the anode to the cathode without regulating the pH of the solutions contained in the dilution and concentration circuits but regulating the electricity supply, either in voltage or in current; and c) in recovering a hexahydrated nickel hypophosphite solution from one of the concentration circuits.

2. A method according to claim 1, wherein the applied current density can go up to 150 A/m$^2$ for a voltage density that can go up to 5 volts per cell.

3. A method according to claim 1, wherein the concentration of the hexahydrated nickel sulfate solution in the first dilution circuit lies in the range 0 to 2 M, the concentration of the monohydrated sodium hypophosphite solution in the second dilution circuit lies in the range 0 to 4 M, the concentration of the sodium sulfate solution obtained in the second concentration circuit lies in the range 0 to 1 M, while the concentration of the hexahydrated nickel hypophosphite solution obtained in the second concentration circuit lies in the range 0 to 1 M.

4. A method according to claim 1, wherein both electrode compartments are filled with a solution of sodium sulfate, said electrode compartments being separated from the electrodialysis cells by respective cationic membranes, the anode compartment being in register with an anionic membrane and the cathode compartment being in register with a cationic membrane.

5. A method according to claim 1, for discontinuous operation, wherein the electricity supply is interrupted when the electrical voltage becomes equal to 18 volts.

6. A method according to claim 5, wherein, starting from a nickel hypophosphite solution at 1.1 g/l, and after operating for a time of 405 min to 415 min, the resulting nickel hypophosphite solution is at a concentration of about 202 g/l to 212 g/l.

7. A method according to claim 1, for continuous operation, wherein a certain quantity of concentrated hexahydrated nickel hypophosphite solution is taken periodically from the corresponding concentration circuit whenever the electrical conductivity in said concentration circuit reaches a predetermined value corresponding to the concentration desired for the concentrated hexahydrated nickel hypophosphite solution, and a certain quantity of hexahydrated nickel sulfate solution and of sodium hypophosphite solution is added into the two dilution circuits respectively.

8. A method according to claim 7, wherein, for a desired concentration of 167 g/l for the concentrated nickel hypophosphite solution, the conductivity of the concentrated nickel hypophosphite solution at 167 g/l is 35 mS.

9. A method according to claim 8, wherein nickel sulfate solution and sodium hypophosphite solution are added whenever the conductivities of the first and second dilution circuits drop below predetermined thresholds, and wherein the predetermined thresholds are 25 mS for the first dilution circuit (nickel sulfate), and 45 mS for the second dilution circuit (sodium hypophosphite).

10. A method according to claim 7, wherein nickel sulfate solution and sodium hypophosphite solution are added whenever the conductivities of the first and second dilution circuits drop below predetermined thresholds.

* * * * *